V. LANCÍA.
LUBRICATION MECHANISM FOR COMBUSTION ENGINES.
APPLICATION FILED MAR. 23, 1911.

1,083,329.

Patented Jan. 6, 1914.

Witnesses:
R. H. Taylor
N. C. Jones

Inventor:
Vincenzo Lancia
By Wm. E. Boulter,
Attorney

UNITED STATES PATENT OFFICE.

VINCENZO LANCÍA, OF TURIN, ITALY.

LUBRICATION MECHANISM FOR COMBUSTION-ENGINES.

1,083,329. Specification of Letters Patent. Patented Jan. 6, 1914.

Application filed March 23, 1911. Serial No. 616,545.

*To all whom it may concern:*

Be it known that I, VINCENZO LANCÍA, a subject of the King of Italy, and residing at Turin, Italy, have invented certain new and useful Improvements in Lubrication Mechanism for Combustion-Engines, of which the following is a specification.

This invention relates to a device by means of which it is possible to do without the special pump ordinarily used in combustion engines for forced lubrication, by utilizing for the purpose a pair of toothed wheels of the valve or other mechanism.

Figure 1:
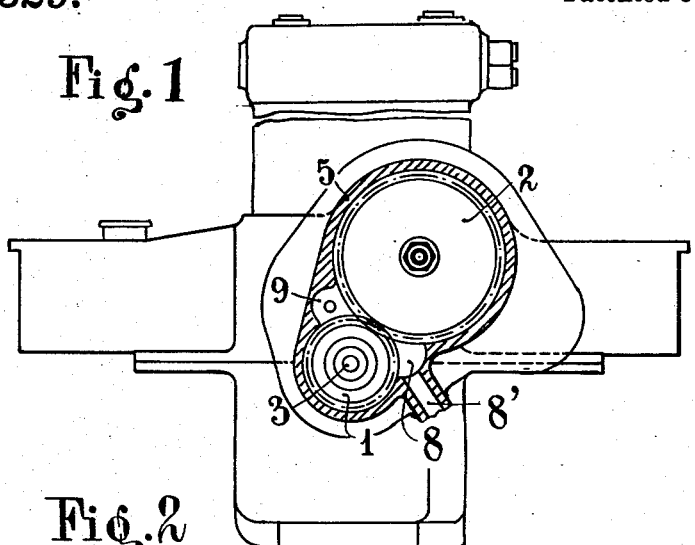
Figure 2:
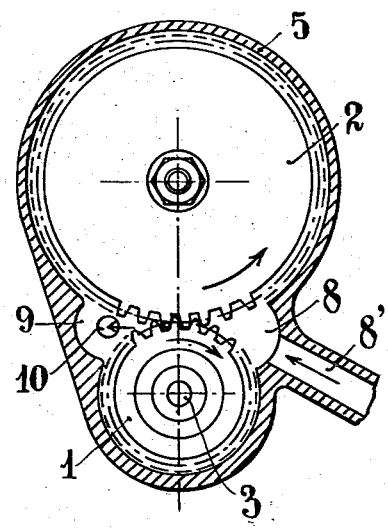

A construction according to this invention is illustrated by way of example in the accompanying drawing. The oil pump in this construction is constituted by the pair of toothed wheels transmitting motion from the driving shaft to the cam shaft. Figure 1 shows diagrammatically the said construction. Fig. 2 is an end view partly in section on an enlarged scale, and Fig. 3 a longitudinal section through the wheel axles.

Figure 3:
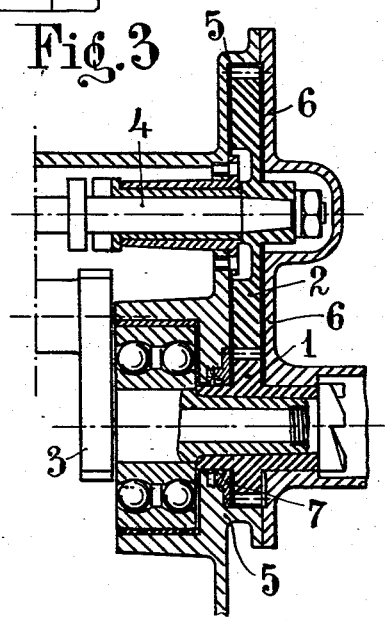

As shown in Fig. 3, the pinion 1 secured to the crank shaft 3 of the engine, and the pinion 2 mounted on the cam shaft 4, are inclosed in an air tight manner in the chamber 5 by the cover 6. The cam shaft, as is well-known, forms part of the valve-operating mechanism of the engine and it is not thought necessary to illustrate any other or further elements of said valve-operating mechanism for a clear understanding of the present invention. A packing 7 prevents any communication between the said chamber and the bearings of the driving shaft 3. Opposite the point where the wheels 1 and 2 engage with each other, the chamber is provided with lateral widened portions 8 and 9 (Figs. 1 and 2) the first of which is connected to the oil suction pipe 8' while the second one is connected through the hole 10 to the conduit distributing the oil to the different parts to be lubricated. Thus, the two wheels 1 and 2 rotating in the direction shown by the arrows in Fig. 2, constitute a kind of an ordinary pump with toothed wheels, drawing oil from the conduit 8 in order to force it into the chamber 9 and then into the oil conduit.

Of course, in place of the toothed wheels controlling the cam shaft, the toothed wheels transmitting motion to the magneto or to the water circulating pump, could be utilized as an oil pump in the same way, with obvious modifications. In any case, this construction renders unnecessary a separate pump for forced lubrication and results in a considerable economy of parts.

What I claim as my invention and desire to secure by Letters Patent is:—

1. In lubricating mechanism for combustion engines the combination of a crank-shaft, a cam shaft forming part of valve-operating mechanism of the engine, a pinion keyed on the crank-shaft, a pinion keyed at the cam shaft and meshing with the crank-shaft pinion, an air-tight casing containing the two pinions, an oil suction conduit connected to said casing for supplying oil thereto, and an oil delivery conduit also connected to said casing for discharging oil therefrom.

2. In lubricating mechanism for combustion engines the combination of a rotatable driving shaft, means comprising a second rotatable shaft for effecting by its rotation the operation of other elements of the engine, means for effecting the rotation of said last-mentioned shaft from the driving shaft comprising a pinion keyed to the driving shaft, a pinion keyed to the other shaft and meshing with the pinion on the driving shaft, a casing containing the two pinions, an oil suction conduit connected to said casing for supplying oil thereto, and an oil delivery conduit also connected to said casing for discharging oil therefrom.

In testimony whereof I have signed my name to this specification in the presence of two subscribing witnesses.

VINCENZO LANCÍA.

Witnesses:
 PIERO GIEUOLIO,
 CARLO TORTA.